US011681762B2

(12) United States Patent
DeLuca et al.

(10) Patent No.: US 11,681,762 B2
(45) Date of Patent: Jun. 20, 2023

(54) DIGITAL TWIN ASSET SEARCH (71) Applicant: INTERNATIONAL BUSINESS MACHINES CORPORATION, Armonk, NY (US)

(72) Inventors: Lisa Seacat DeLuca, Bozeman, MT (US); Sarika Budhiraja, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 17/159,202

(22) Filed: Jan. 27, 2021

(65) Prior Publication Data
US 2022/0237243 A1 Jul. 28, 2022

(51) Int. Cl.
G06F 16/00 (2019.01)
G06F 16/9532 (2019.01)
G06F 16/9538 (2019.01)
G06N 20/00 (2019.01)
G06F 16/908 (2019.01)
G06F 18/214 (2023.01)

(52) U.S. Cl.
CPC ........ G06F 16/9532 (2019.01); G06F 16/908 (2019.01); G06F 16/9538 (2019.01); G06F 18/214 (2023.01); G06N 20/00 (2019.01)

(58) Field of Classification Search
CPC ............... G06F 16/9532; G06F 16/908; G06F 16/9538; G06K 9/6256; G06N 20/00; G06Q 10/087; G06Q 30/0623
See application file for complete search history.

(56) References Cited

U.S. PATENT DOCUMENTS

| 8,620,767 | B2 | 12/2013 | Linden |
| 10,522,854 | B2* | 12/2019 | Wang ................ H01M 8/04604 |
| 2010/0191619 | A1 | 7/2010 | Dicker |
| 2015/0334201 | A1 | 11/2015 | Werner |
| 2016/0328789 | A1* | 11/2016 | Grosz ................... G06F 3/1287 |
| 2018/0121988 | A1 | 5/2018 | Hiranandani |
| 2018/0210436 | A1* | 7/2018 | Burd .................. G05B 23/0294 |
| 2019/0138667 | A1* | 5/2019 | Benesh ................. G06Q 50/08 |
| 2019/0258747 | A1* | 8/2019 | Milev ................. G06F 16/9032 |
| 2019/0354922 | A1* | 11/2019 | Berti .................... G06F 21/6209 |
| 2021/0104317 | A1* | 4/2021 | Warner ............... G06F 9/44526 |

OTHER PUBLICATIONS

IBM, "IBM Digital Twin Exchange offers an online marketplace for buying and selling digital twin assets", IBM U.S. Software Annoucement 220-35, Febrary 11, 2020, https://www 01.ibm.com/common/ssi/ShowDoc.wss?docURL=/common/ssi/rep_ca/5/897/ENUS220 035/index.html&request_locale=en, pp. 1-7.
IBM, "Maximo integration with Digital Twin Exchange", https://community.ibm.com/community/user/iot/blogs/sarika-budhiraja1/2020/09/10/maximo-digitaltwin, Oct. 12, 2020, pp. 1-5.
Mell et al., "The NIST Definition of Cloud Computing", National Institute of Standards and Technology, Special Publication 800-145, Sep. 2011, pp. 1-7.

* cited by examiner

Primary Examiner — Jared M Bibbee
(74) Attorney, Agent, or Firm — Kristofer Haggerty (57) ABSTRACT The exemplary embodiments disclose a method, a computer program product, and a computer system for obtaining a digital twin asset. The exemplary embodiments may include collecting input data, extracting one or more features from the input data, searching for a digital twin asset based on the extracted one or more features and one or more models, and facilitating an exchange of the digital twin asset.

14 Claims, 7 Drawing Sheets

DIGITAL TWIN ASSET SEARCH

BACKGROUND

The exemplary embodiments relate generally to digital twin assets, and more particularly to searching for and obtaining digital twin assets.

Many physical assets are associated with one or more digital resources which may be helpful to users of the physical assets. These digital resources are often not easily accessible and reviewable by prospective purchasers of physical assets. For example, a purchaser of a car engine may wish to quickly and efficiently review digital twin schematics to assess compatibility with their car prior to purchasing the car engine.

SUMMARY

The exemplary embodiments disclose a method, a computer program product, and a computer system for obtaining a digital twin asset. The exemplary embodiments may include collecting input data, extracting one or more features from the input data, searching for a digital twin asset based on the extracted one or more features and one or more models, and facilitating an exchange of the digital twin asset.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many physical assets are associated with one or more digital resources which may be helpful to users of the physical assets. These digital resources are often not easily accessible and reviewable by prospective purchasers of physical assets. For example, a purchaser of a car engine may wish to quickly and efficiently review digital twin schematics to assess compatibility with their car prior to purchasing the car engine.

Exemplary embodiments are directed to a method, computer program product, and computer system for digital twin asset searching. In embodiments, machine learning may be used to create models capable of searching for digital twin assets, while feedback loops may improve upon such models. Moreover, data from user uploads, databases, or the sensors 124 may be used to search for digital twin assets. A user may wish to search for one or more digital twin assets for a number of purposes. For example, a purchaser of a car engine may wish to quickly and efficiently review digital twin schematics to assess compatibility with their car prior to purchasing the car engine. In another example, a purchaser of an air purifier may wish to quickly and efficiently review research performed on the efficacy of the air purifier in preventing asthmatic symptoms. In general, it will be appreciated that embodiments described herein may relate to searching for any type of digital asset (i.e., digital twin schematics, digital research files, digital source codes, digital user manuals, etc.) within any environment and for any motivation.

Figure 1:
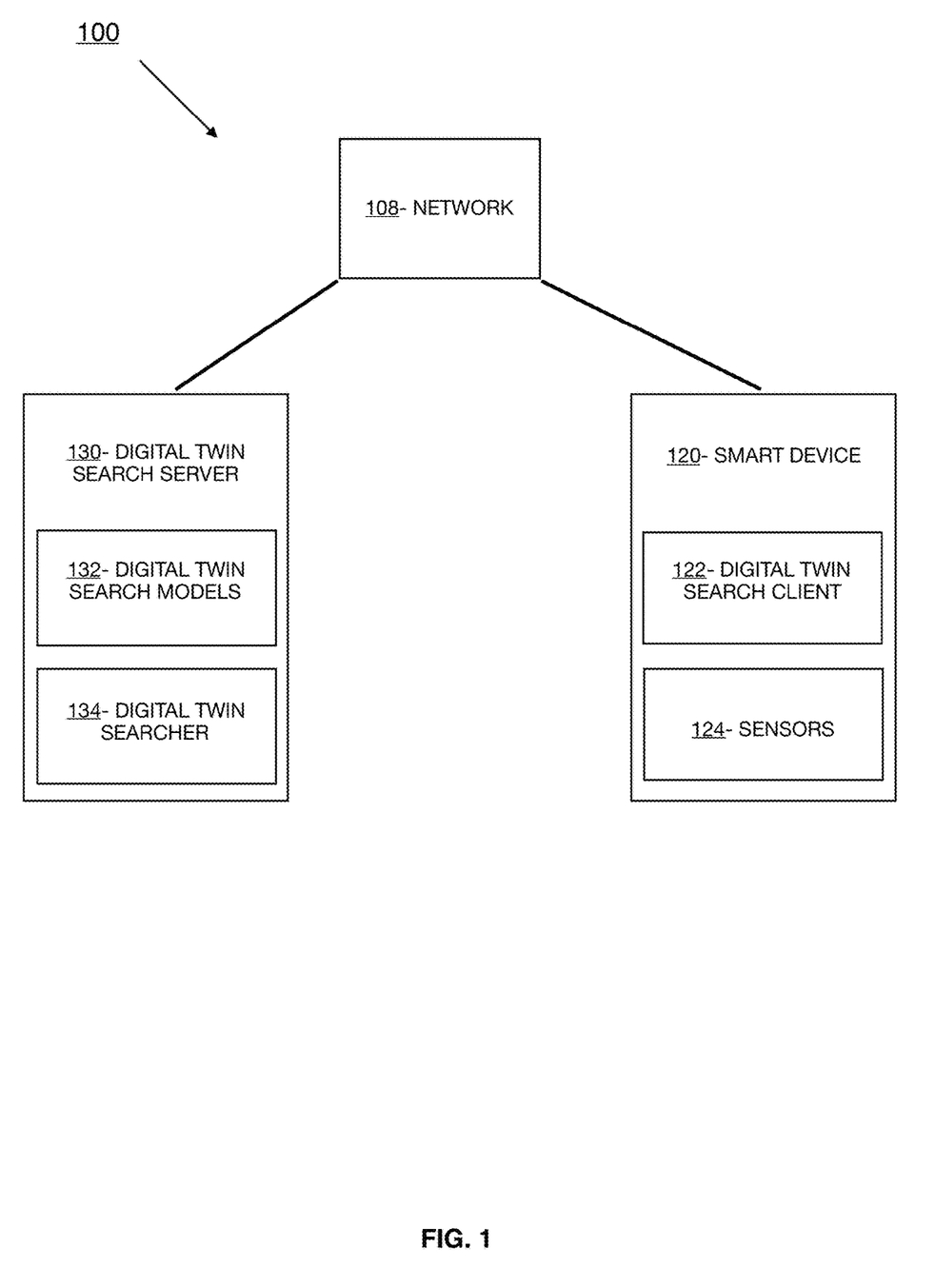
FIG. 1 depicts an exemplary schematic diagram of a digital twin search system 100, in accordance with the exemplary embodiments.

FIG. 1 depicts the digital twin search system 100, in accordance with the exemplary embodiments. According to the exemplary embodiments, the digital twin search system 100 may include a smart device 120 and a digital twin search server 130, which may be interconnected via a network 108.

While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the digital twin search system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a digital twin search client 122 and one or more sensors 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The digital twin search client 122 may act as a client in a client-server relationship with a server, for example a digital twin search server 130. The digital twin search client 122 may also be a software and/or hardware application capable of communicating with and providing a user interface for a user to interact with a server via the network 108. Moreover, in the example embodiment, the digital twin search client 122 may be capable of transferring data from the sensors 124 between the smart device 120 and other devices via the network 108. In embodiments, the digital twin search client 122 utilizes various wired and wireless connection protocols for data transmission and exchange, including Bluetooth, 2.4 gHz and 5 gHz internet, near-field communication, Z-Wave, Zigbee, etc. The digital twin search client 122 is described in greater detail with respect to FIG. 2.

In example embodiments, the sensors 124 may comprise a camera, microphone, light sensor, infrared sensor, movement detection sensor, or other sensory hardware equipment. Moreover, the smart device 120 may incorporate an array of the one or more sensors 124 such that information can be obtained by the sensors 124 in multiple directions, at different times/intervals, in different mediums/frequencies, and the like. For example, the smart device 120 may include three forward-facing cameras that each record an adjacent sixty-degree viewing angle spanning a total of one-hundred and eighty degrees in the direction of a user. Moreover, data processing techniques may be implemented such that directional information of visual and audio data can be obtained based on signals received by each of the three sensors 124, such as trilateration and triangulation.

While the sensors 124 are depicted as integrated with the smart device 120, in embodiments, the sensors 124 may be incorporated within an environment in which the digital twin search system 100 is implemented. For example, the sensors 124 may be one or more microphones built into an auditorium, a camera built into a facility, etc. Moreover, data processing techniques may be implemented such that directional information of visual and audio data can be obtained based on signals received by each of the sensors 124, such as trilateration and triangulation. In other embodiments, the sensors 124 may be integrated with other smart devices, e.g., smart phones and laptops, within an environment implementing the digital twin search system 100. In such embodiments, the sensors 124 may communicate directly with other networks and devices, such as the network 108. In embodiments, the digital twin searcher 134 may utilize data collected from the sensors 124 to record video. The sensors 124 are described in greater detail as a hardware implementation with reference to FIG. 5, as part of a cloud implementation with reference to FIG. 6, and/or as utilizing functional abstraction layers for processing with reference to FIG. 7.

In the exemplary embodiments, the digital twin search server 130 may include one or more digital twin search models 132 and a digital twin searcher 134, and may act as a server in a client-server relationship with the digital twin search client 122. The digital twin search server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the digital twin search server 130 is shown as a single device, in other embodiments, the digital twin search server 130 may be comprised of a cluster or plurality of computing devices, working together or working independently. The digital twin search server 130 is described in greater detail as a hardware implementation with reference to FIG. 5, as part of a cloud implementation with reference to FIG. 6, and/or as utilizing functional abstraction layers for processing with reference to FIG. 7.

The digital twin search models 132 may be one or more algorithms modelling a correlation between one or more features detected by the sensors 124 and an appropriate search for digital twin assets. In the example embodiment, the digital twin search models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of one or more features being indicative of an appropriate or successful search for digital twin assets. In embodiments, such features may include features such as names, types, vendors, manufacturers, models, serial numbers, subassembly information, performance specifications, costs, quantities, availability, location, etc. The digital twin search models 132 may weight the features based on an effect that the features have on appropriately searching for digital twin assets.

In the exemplary embodiments, the digital twin searcher 134 may be a software and/or hardware program capable of collecting training data, extracting features from the training data, and training one or more models based on the extracted features. The digital twin searcher 134 may additionally be capable of configuring a session and collecting input data, extracting features from the collected data, and applying one or more models to the extracted features to search for digital twin assets. Moreover, the digital twin searcher 134 may be further configured for notifying the user of one or more appropriate digital twin assets and optionally facilitating a purchase or exchange of one or more digital twin assets and/or physical assets. The digital twin searcher 134 is additionally capable of evaluating whether the digital twin search was appropriate and adjusting the one or more models. The digital twin searcher 134 is described in greater detail with reference to FIG. 2.

Figure 2:
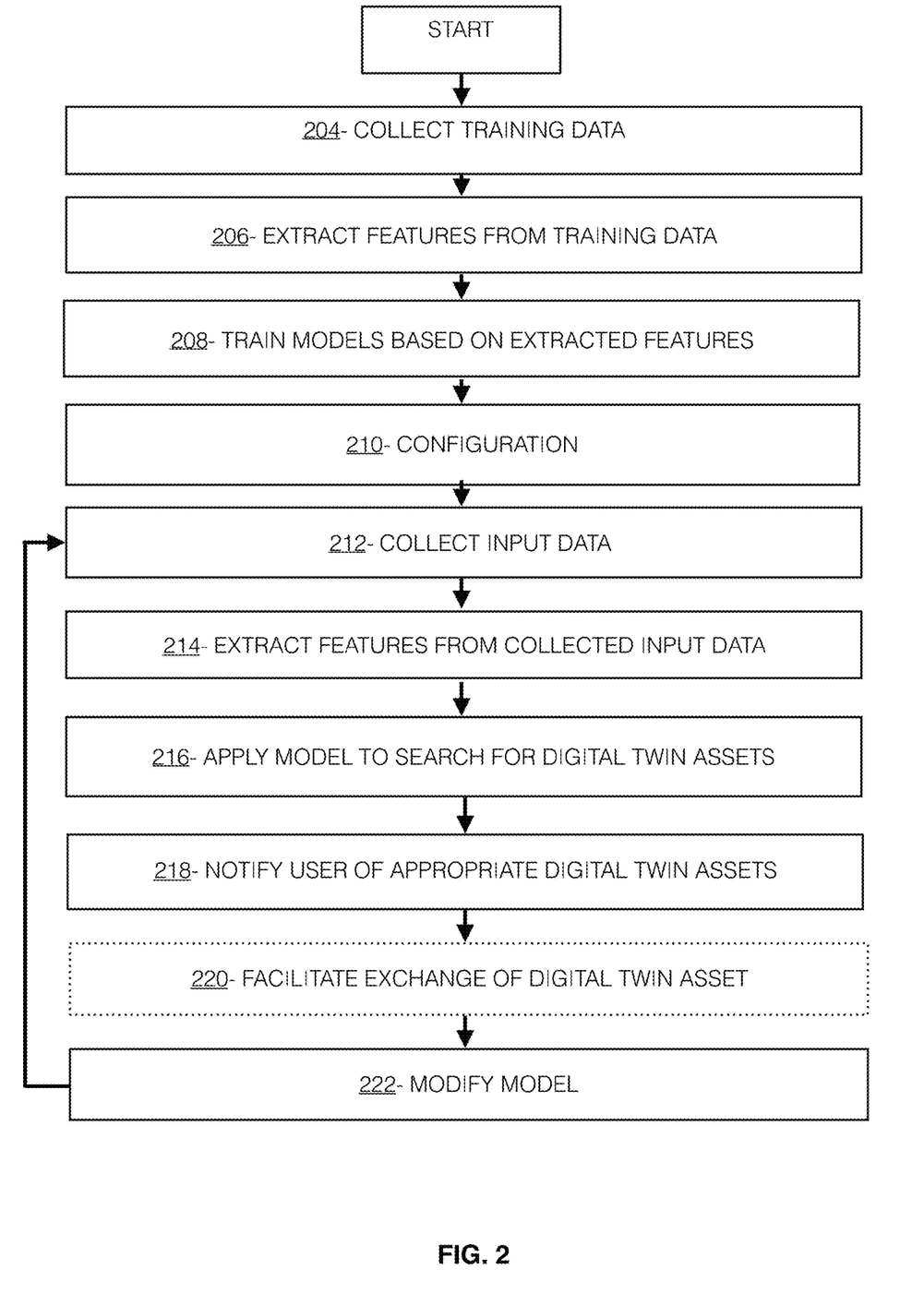
FIG. 2 depicts an exemplary flowchart illustrating the operations of a digital twin searcher 134 of the digital twin search system 100 in searching for digital twin assets, in accordance with the exemplary embodiments.

FIG. 2 depicts an exemplary flowchart illustrating the operations of a digital twin searcher 134 of the digital twin search system 100 in searching for digital twin assets, in accordance with the exemplary embodiments. In exemplary embodiments, the digital twin searcher 134 first implements a training phase in which it trains the digital twin search models 132 using training data including various input data (i.e., digital twin search criteria) and associated digital twin search results. The digital twin searcher 134 then moves on to an operational phase in which it applies the trained digital twin search models 132 to current input data in order to appropriately search for digital twin assets.

The digital twin searcher 134 may collect and/or receive training data (step 204). In embodiments, training data may include input data such as digital twin search criteria and associated digital twin search results. For example, the digital twin searcher 134 may collect training data as digital twin search criteria for a car engine from a particular manufacturer with serial number 937620, and an associated search result of three car engines meeting (or close to meeting) all of the digital twin search criteria. The digital twin searcher 134 may retrieve training data via user upload, databases, or the sensors 124. In embodiments, the digital twin searcher 134 may collect training data via the sensors 124 as one or more microphones built into an auditorium, a camera built into a facility, etc. For example, microphone sensors 124 may collect audio of a user explaining criteria for their digital twin search. In embodiments, collected training data may also be associated to one or more users. For example, training data of John's search criteria may be labelled with, "user: John." The digital twin searcher 134 may collect training data associated with specific users to later train different digital twin search models 132 for different users based on the users' preferences, characteristics, and/or tendencies (i.e., John may prioritize low cost in digital twin searches, while Rachel may prioritize high performance specifications in digital twin searches). In embodiments, collected training data may include global positioning services (GPS) data of one or more users, for example to determine a user's location and/or whether a physical asset can be shipped to the user's location (or shipped to the user's location in a timely manner).

To further illustrate the operations of the digital twin searcher 134, reference is now made to an illustrative example where the digital twin searcher 134 collects training data consisting of various digital twin search criteria associated with digital twin search results.

The digital twin searcher 134 may extract one or more features from the collected and/or received training data (step 206). The extracted features may be extracted from the collected training data, which may be collected via user upload, databases, or the sensors 124, and may include features such as names, types, vendors, manufacturers, models, serial numbers, subassembly information, performance specifications, costs, quantities, availabilities, keywords, technical specifications, locations, etc. In embodiments, the digital twin searcher 134 may use techniques such as feature extraction, natural language processing, sentiment analysis, optical character recognition, image processing, audio processing, pattern/template matching, data comparison, etc. to identify features. For example, the digital twin searcher 134 may use feature extraction, optical character recognition, and data comparison to extract names, types, vendors, manufacturers, models, serial numbers, subassembly information, performance specifications, costs, quantities, availabilities, keywords, technical specifications, locations, etc. directly from user uploaded text or text from databases. The digital twin searcher 134 may additionally utilize image processing, audio processing, video processing, and natural language processing to extract features from collected audio and/or video. For example, the digital twin searcher 134 may utilize audio and video processing to extract names, types, vendors, manufacturers, models, serial numbers, subassembly information, performance specifications, costs, quantities, availabilities, keywords, technical specifications, locations, etc. from collected audio and video. The digital twin searcher 134 may later associate extracted features with associated digital twin asset search results when training one or more models.

With reference to the previously introduced example where the digital twin searcher 134 collects training data consisting of digital twin search criteria associated with digital twin search results, the digital twin searcher 134 extracts features names, types, vendors, manufacturers, models, serial numbers, subassembly information, performance specifications, costs, quantities, availabilities, keywords, technical specifications, locations, etc. from the collected training data.

The digital twin searcher 134 may train one or more digital twin search models 132 based on the extracted features (step 208). The digital twin searcher 134 may train one or more digital twin search models 132 based on an association of the one or more extracted features with one or more digital twin asset searches. As previously mentioned, such extracted features may include names, types, vendors, manufacturers, models, serial numbers, subassembly information, performance specifications, costs, quantities, availabilities, keywords, technical specifications, locations, etc. and the one or more digital twin search models 132 may be generated through machine learning techniques such as convolutional neural networks. Moreover, the digital twin searcher 134 may train the one or more digital twin search models 132 to weight the features such that features shown to have a greater correlation with an appropriate digital twin asset search are weighted greater than those features that are not. Moreover, the digital twin searcher 134 may train different digital twin search models 132 for different users based on users' preferences, characteristics, and/or tendencies. Based on the digital twin search models 132's extracted features and weights associated with such extracted features, the digital twin searcher 134 may later determine an appropriate search result of a digital twin asset search.

With reference to the previously introduced example where the digital twin searcher 134 extracts features names, types, vendors, manufacturers, models, serial numbers, subassembly information, performance specifications, costs, quantities, availability, location, etc. from the collected training data, the digital twin searcher 134 trains a model based on an association of the extracted features with appropriate digital twin asset search results.

The digital twin searcher 134 may receive a configuration (step 210). The digital twin searcher 134 may receive a configuration by receiving a user registration and user preferences. The user registration may be uploaded by a user, i.e., a person searching for one or more digital twins or digital material, and the configuration may be received by the digital twin searcher 134 via the digital twin search client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial number, smart device 120 type, types of the sensors 124, and the like. Lastly, the digital twin searcher 134 may receive a configuration of the one or more sensors 124, whether they be fixed to one or more devices (e.g., the smart device 120) or fixed within an environment in which the digital twin search system 100 is implemented.

During configuration, the digital twin searcher 134 may further receive user preferences (step 210 continued). User preferences may include preferences for the manner in which the digital twin searcher 134 should notify one or more users of a digital twin search. For example, a user may upload user preferences specifying that they are to be notified of available digital twins sorted by costs, availabilities, performance specifications, etc. In embodiments, user preferences may additionally specify that upon notification of a user and that user's confirmation, the digital twin searcher 134 is to facilitate an exchange of one or more digital twin assets and/or physical assets. For example, if the digital twin searcher 134 notifies the user of a car engine digital twin search result and the user confirms that they would like the car engine digital twin as well as the physical car engine, the digital twin searcher 134 may obtain the car engine digital twin and the physical car engine (i.e. via purchase, exchange of credits, etc.) on behalf of the user. In embodiments, user preferences may be configured alternatively.

With reference to the previously introduced example where the digital twin searcher 134 trains a model based on an association of the extracted features with appropriate digital twin asset search results, the user uploads a user registration including the user's name, user's computer as smart device 120, and user's video cameras as sensors 124. The user also uploads user preferences specifying that notification of digital twin search results are to be communicated to the user sorted by costs, and confirmation from the user must be received prior to facilitating an exchange of one or more digital twin assets.

The digital twin searcher 134 may collect input data (step 212). The input data may include digital twin search criteria, and the digital twin searcher 134 may retrieve input data via user upload, databases, integration of the digital twin search client 122 with the operating system of smart device 120, or the one or more sensors 124. In embodiments, digital twin search criteria may include names, types, vendors, manufacturers, models, serial numbers, subassembly information, performance specifications, costs, quantities, availabilities, keywords, technical specifications, locations, etc. of assets and/or their digital twins. In embodiments, the digital twin searcher 134 may collect input data via the sensors 124 as one or more microphones built into an auditorium, a camera built into a facility, etc. For example, video camera sensors 124 and microphone sensors 124 may collect footage of a user specifying digital twin search criteria. The digital twin searcher 134 may collect input data to later extract features of the input data and apply one or more digital twin search models 132 to appropriately search for one or more digital twin assets.

Figure 3:
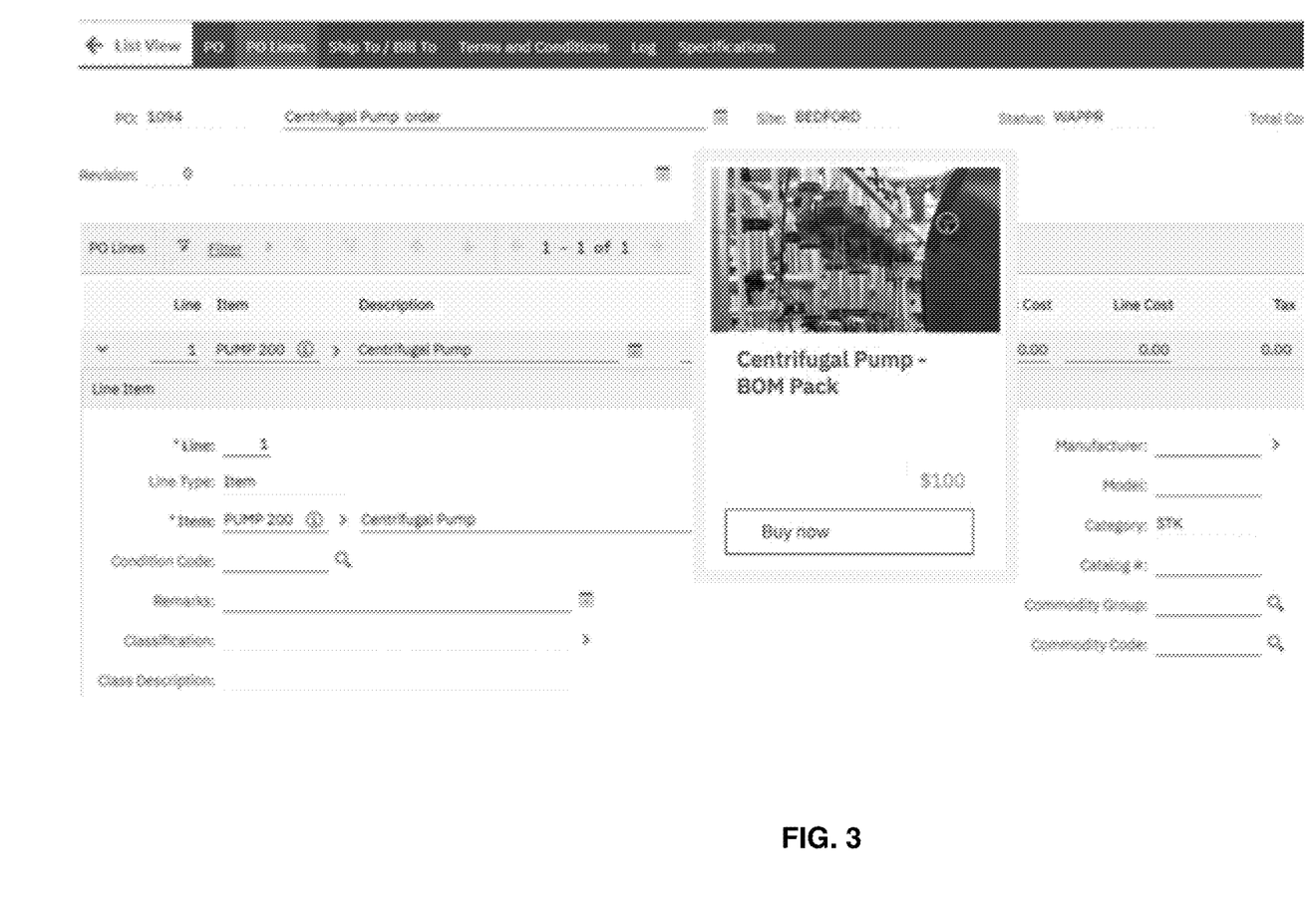
FIG. 3 depicts an exemplary user interface of the digital twin search system 100 illustrating a successful search for a digital twin asset, in accordance with the exemplary embodiments.

With reference to the previously introduced example where the user uploads a user registration and user preferences, and additionally with reference to FIG. 3, the digital twin searcher 134 collects input data from the user typing their search criteria for a centrifugal pump into a user interface on their computer (smart device 120).

The digital twin searcher 134 may extract one or more features from the collected input data (step 214). The digital twin searcher 134 may extract one or more features from the collected input data in the same manner as described above with respect to extracting features from the training data. However, the digital twin searcher 134 extracts one or more features from the current collected input data instead of from the previously collected training data.

With reference to the previously introduced example where the digital twin searcher 134 collects input data of the user's search criteria, and additionally with reference to FIG. 3, the digital twin searcher 134 utilizes a convolutional neural network and optical character recognition to extract the features listed in Table 1 below.

TABLE 1

| Extracted Features | |
|---|---|
| Name | Centrifugal Pump |
| Type | PUMP 200 |
| Quantity | 1 |
| Performance Specification | 200 gallons per hour |
| Availability | Within next 2 weeks |
| Location | Bedford, NY |

The digital twin searcher 134 may apply one or more models to the extracted features to determine an appropriate digital twin asset search (step 216). As previously mentioned, such extracted features may include names, types, vendors, manufacturers, models, serial numbers, subassembly information, performance specifications, costs, quantities, availability, locations, etc. and the one or more digital twin search models 132 may be generated through machine learning techniques such as neural networks. In embodiments, the one or more digital twin search models 132 may be trained at initialization and/or through the use of a feedback loop to weight the features such that features shown to have a greater correlation with appropriately searching for digital twin assets are weighted greater than those features that are not. Based on the extracted features and weights associated with such extracted features, the digital twin searcher 134 may determine one or more digital twin asset search results.

With reference to the previously introduced example where the digital twin searcher 134 extracts features of the input data, and additionally with reference to FIG. 3, the digital twin searcher 134 determines that the Centrifugal Pump-BOM Pack is the best digital twin asset for the user.

Upon the digital twin searcher 134 searching for digital twin assets, the digital twin searcher 134 may notify the user of the one or more appropriate digital twin assets (step 218). In embodiments, the digital twin searcher 134 may notify the user of appropriate digital twin assets with corresponding available physical assets, and additionally of appropriate digital twin assets without corresponding available physical assets (i.e. if a user already has a physical asset, but seeks only the digital twin for their physical asset for modelling purposes). The digital twin searcher 134 may convey the one or more appropriate digital twin assets to the user in the form of audio, video, text, or any other manner via the smart device 120 or any other device. The notification of more than one appropriate digital twin assets may be conveyed visually in the form of a queue or ranking via text and/or audially via one or more integrated speakers. In embodiments where no digital twin assets are appropriate, and additionally with reference to FIG. 4, the digital twin searcher 134 may display a notification to the user stating that no appropriate digital twin assets are available and/or may suggest alternative digital twin assets. As previously discussed, the digital twin searcher 134 may notify a user according to the user preferences of configuration.

With reference to the previously introduced example where the digital twin searcher 134 determines that the Centrifugal Pump-BOM Pack is the best digital twin asset for the user, and additionally with reference to FIG. 3, the digital twin searcher 134 visually notifies the user of the Centrifugal Pump-BOM Pack as the most appropriate search result according to the user's preferences.

Upon the digital twin searcher 134 notifying the user of appropriate digital twin assets, the digital twin searcher 134 may facilitate an exchange of one or more digital twin assets and/or corresponding physical assets. In embodiments, the digital twin searcher 134 may facilitate an exchange of one or more digital twin assets and/or corresponding physical assets by executing one or more sale or exchange of currency or credits for one or more digital twin assets or physical assets. For example, the digital twin searcher 134 may facilitate an exchange of one or more digital twin assets by subtracting the cost of a digital twin asset from the user's credit balance and providing access to the digital twin asset to the user. In another example, the digital searcher 134 may facilitate an exchange of a digital twin asset and purchase of corresponding physical asset by charging the costs to a user's credit card. In embodiments, the digital twin searcher 134 may require confirmation from the user before facilitating an exchange of one or more digital twin assets. For example, the digital twin searcher 134 may notify a user of the most appropriate digital twin asset as discussed in step 218, and subsequently require the user to click a button "confirm purchase" to facilitate the exchange of the digital twin asset. In embodiments, the digital twin searcher 134 may be configured to facilitate an exchange of a digital twin asset in an alternate manner.

With reference to the previously introduced example where the digital twin searcher 134 visually notifies the user of the Centrifugal Pump-BOM Pack as the most appropriate search result according to the user's preferences, and additionally with reference to FIG. 3, the digital twin searcher 134 receives confirmation from the user via the clicking of button "confirm purchase" and facilitates the exchange of the Centrifugal Pump-BOM Pack digital twin asset and corresponding physical asset for $100.

The digital twin searcher 134 may evaluate and modify the digital twin search models 132 (step 222). In the example embodiment, the digital twin searcher 134 may verify whether the digital twin asset search results were appropriate in order to provide a feedback loop for modifying the digital twin search models 132. In embodiments, the feedback loop may simply provide a means for a user to indicate whether the search results were appropriate, accurate, helpful, etc. The feedback loop indication may be triggered via a toggle switch, button, slider, etc. that may be selected by the user manually by hand using a button/touchscreen/etc., by voice, by eye movement, and the like. Based on the digital twin searcher 134 appropriately or inappropriately determining search results, the digital twin searcher 134 may modify the digital twin search models 132 relating to determination of appropriate digital twin search results. In other embodiments, the digital twin searcher 134 may infer or deduce whether the digital twin search results were appropriate. For example, the digital twin searcher 134 may interpret user dialogue via natural language processing to determine whether the search results were reasonable. For example, if the user says, "That isn't right," "This isn't helpful" or other expressions indicative of confusion or dissatisfaction, the digital twin searcher 134 may infer that the search results were inappropriate and modify the digital twin search models 132 accordingly. Based on feedback received in the above or any other manners, the digital twin searcher 134 may then modify the digital twin search models 132 to more accurately search for digital twin assets.

With reference to the previously introduced example where the digital twin searcher 134 receives confirmation from the user via the clicking of button "confirm purchase" and facilitates the exchange of the Centrifugal Pump-BOM Pack digital twin asset and corresponding physical asset for $100, the user says, "Great, all set!" and the digital twin searcher 134 modifies the digital twin search models 132 accordingly.

FIG. 3 depicts an exemplary user interface of the digital twin search system 100 illustrating a successful search for a digital twin asset, in accordance with the exemplary embodiments.

Figure 4:
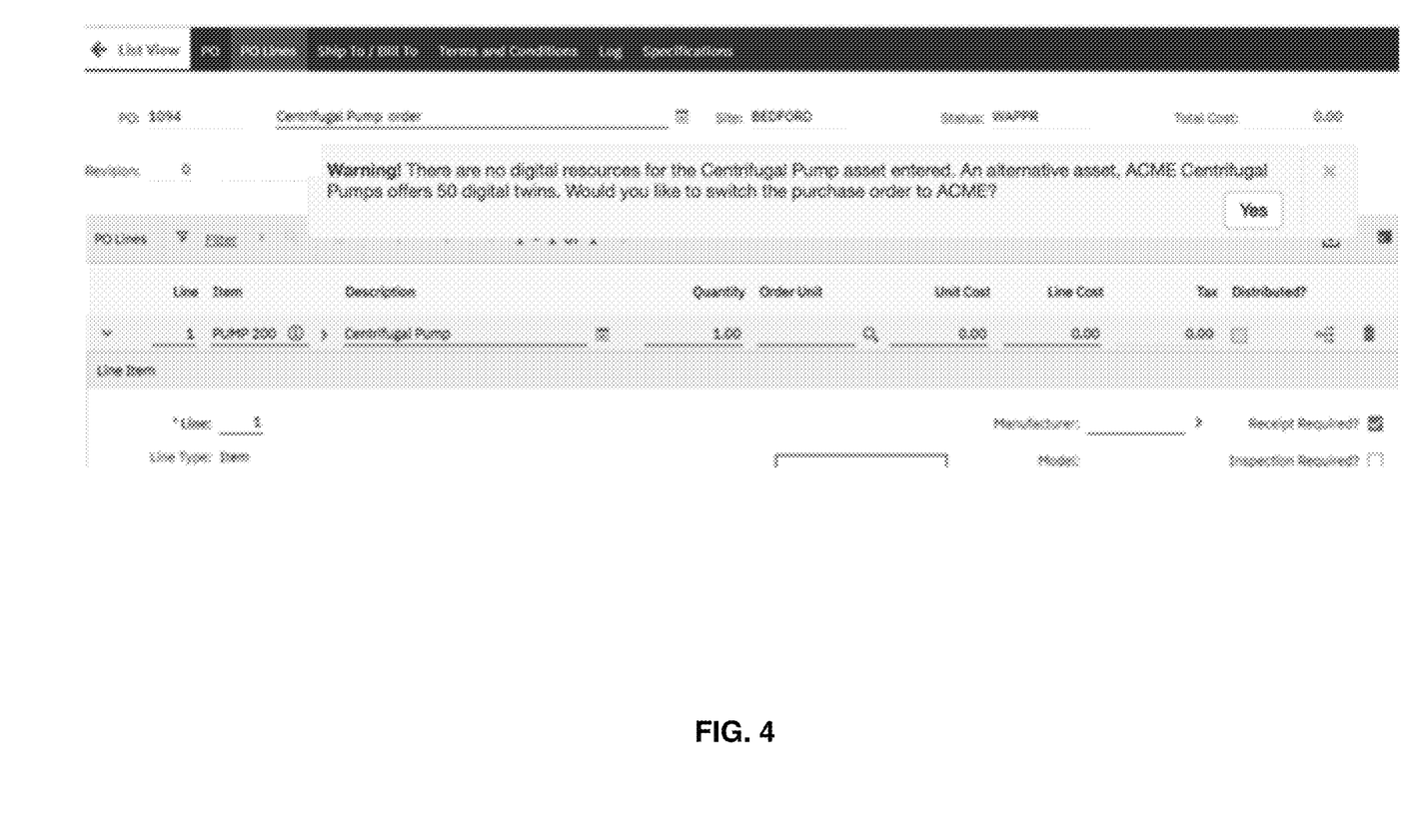
FIG. 4 depicts an exemplary user interface of the digital twin search system 100 illustrating an unsuccessful search for a digital twin asset, in accordance with the exemplary embodiments.

FIG. 4 depicts an exemplary user interface of the digital twin search system 100 illustrating an unsuccessful search for a digital twin asset, in accordance with the exemplary embodiments.

Figure 5:
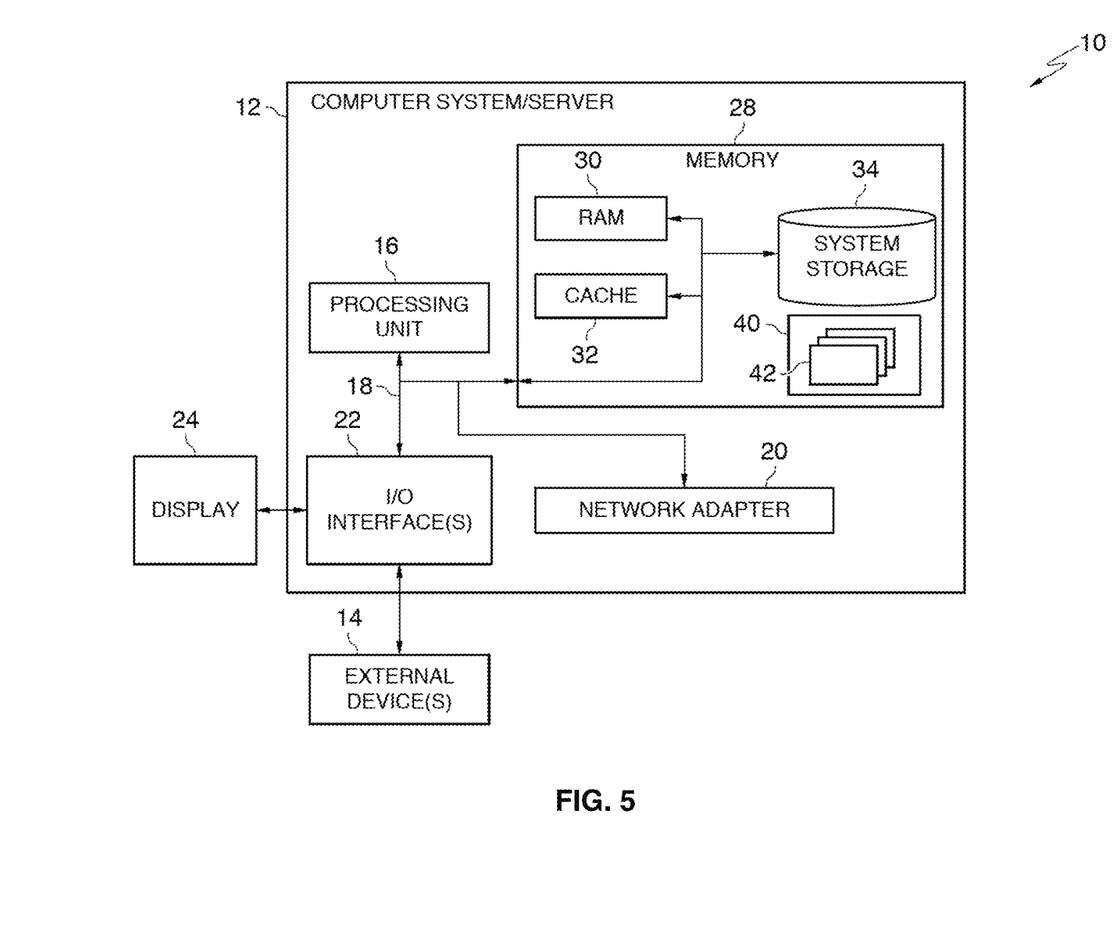
FIG. 5 depicts an exemplary block diagram depicting the hardware components of the digital twin search system 100 of FIG. 1, in accordance with the exemplary embodiments.

FIG. 5 depicts a block diagram of devices within the digital twin search system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
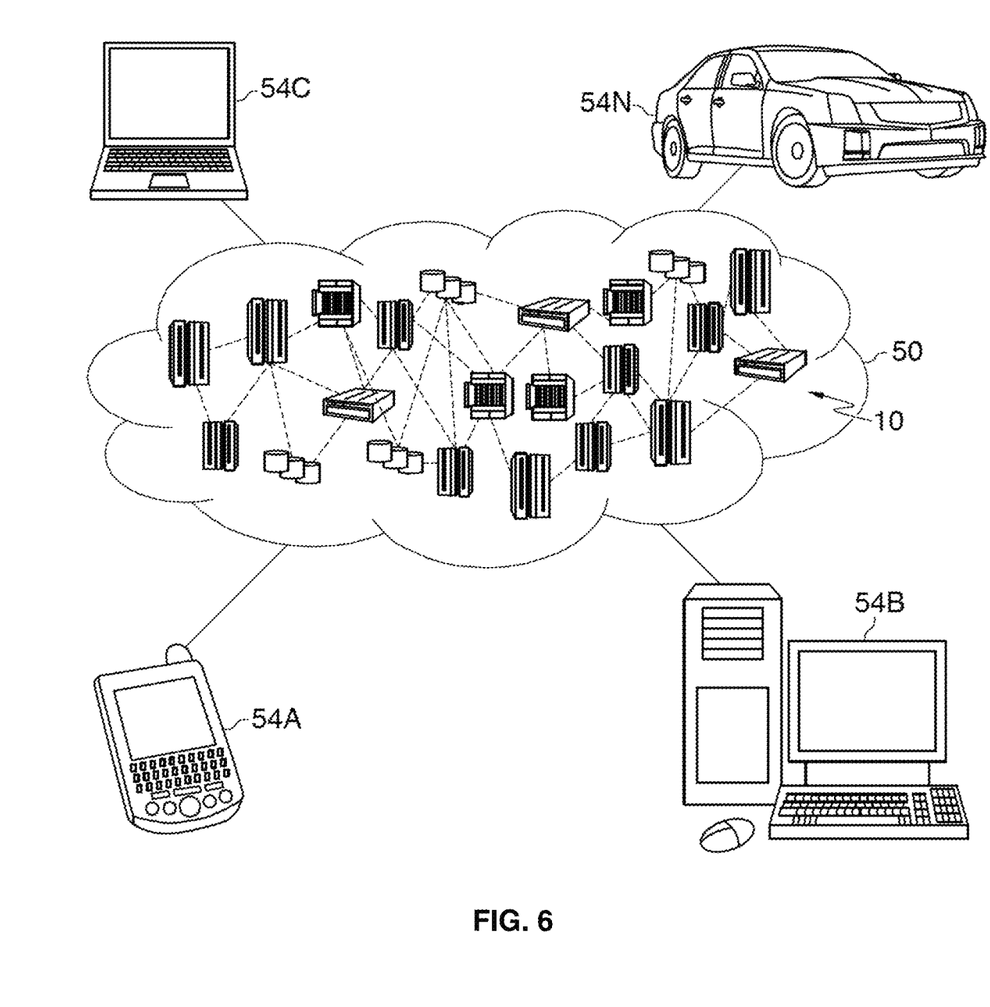
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
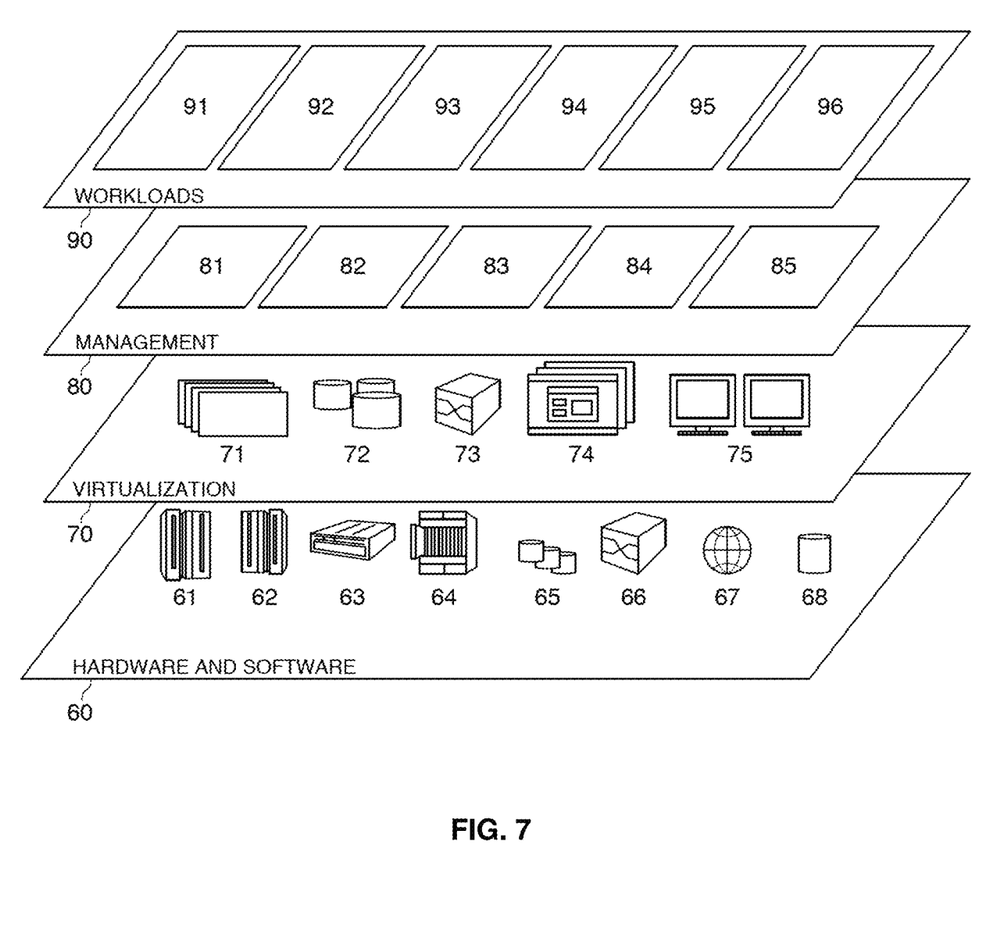
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital twin asset searching 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for obtaining a digital twin asset, the method comprising:
   receiving a query from a user seeking a new asset;
   extracting one or more features from the query;
   applying one or more models to the one or more features to return one or more digital twin assets matching the query;
   determining whether the one or more digital twin assets have a corresponding physical asset;
   displaying to the user the one or more digital twin assets having the corresponding physical asset within a list ranked based on the matching; and
   facilitating an exchange of at least one of the one or more digital twin assets based on receiving a user selection of the at least one of the one or more digital twin assets.

2. The method of claim 1, wherein the one or more models correlate the one or more features with the one or more digital twin assets.

3. The method of claim 1, further comprising:
   receiving feedback from the user indicative of whether the one or more digital twin assets matched the query; and
   adjusting the one or more models based on the received feedback.

4. The method of claim 1, further comprising:
   collecting training data;
   extracting training features from the training data; and
   training the one or more models based on the extracted training features.

5. The method of claim 1, wherein the one or more features include one or more features from the group comprising names, types, vendors, manufacturers, models, serial numbers, subassembly information, performance specifications, costs, quantities, availabilities, keywords, technical specifications, and locations.

6. A computer program product for obtaining a digital twin asset, the computer program product comprising:
   one or more non-transitory computer-readable storage media and program instructions stored on the one or more non-transitory computer-readable storage media capable of performing a method, the method comprising:
   receiving a query from a user seeking a new asset;
   extracting one or more features from the query;
   applying one or more models to the one or more features to return one or more digital twin assets matching the query;
   determining whether the one or more digital twin assets have a corresponding physical asset;
   displaying to the user the one or more digital twin assets having the corresponding physical asset within a list ranked based on the matching; and
   facilitating an exchange of at least one of the one or more digital twin assets based on receiving a user selection of the at least one of the one or more digital twin assets.

7. The computer program product of claim 6, wherein the one or more models correlate the one or more features with the one or more digital twin assets.

8. The computer program product of claim 6, further comprising:
receiving feedback from the user indicative of whether the one or more digital twin assets matched the query; and
adjusting the one or more models based on the received feedback.

9. The computer program product of claim 6, further comprising:
collecting training data;
extracting training features from the training data; and
training the one or more models based on the extracted training features.

10. The computer program product of claim 6, wherein the one or more features include one or more features from the group comprising names, types, vendors, manufacturers, models, serial numbers, subassembly information, performance specifications, costs, quantities, availabilities, keywords, technical specifications, and locations.

11. A computer system for obtaining a digital twin asset, the computer system comprising:
one or more computer processors, one or more computer-readable storage media, and program instructions stored on the one or more of the computer-readable storage media for execution by at least one of the one or more processors capable of performing a method, the method comprising:
receiving a query from a user seeking a new asset;
extracting one or more features from the query;
applying one or more models to the one or more features to return one or more digital twin assets matching the query;
determining whether the one or more digital twin assets have a corresponding physical asset;
displaying to the user the one or more digital twin assets having the corresponding physical asset within a list ranked based on the matching; and
facilitating an exchange of at least one of the one or more digital twin assets based on receiving a user selection of the at least one of the one or more digital twin assets.

12. The computer system of claim 11, wherein the one or more models correlate the one or more features with the one or more digital twin assets.

13. The computer system of claim 11, further comprising:
receiving feedback from the user indicative of whether the one or more digital twin assets matched the query; and
adjusting the one or more models based on the received feedback.

14. The computer system of claim 11, further comprising:
collecting training data;
extracting training features from the training data; and
training the one or more models based on the extracted training features.

* * * * *